United States Patent
Cho

(10) Patent No.: US 7,319,680 B2
(45) Date of Patent: Jan. 15, 2008

(54) METHOD FOR CONTROLLING OPERATIONAL STATES OF A MAC LAYER IN AN OFDM MOBILE COMMUNICATION SYSTEM

(75) Inventor: Sung-Hyun Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 595 days.

(21) Appl. No.: 10/840,585

(22) Filed: May 6, 2004

(65) Prior Publication Data

US 2004/0252662 A1 Dec. 16, 2004

(30) Foreign Application Priority Data

Jun. 13, 2003 (KR) ............... 10-2003-0038374

(51) Int. Cl.
*H04Q 7/00* (2006.01)
(52) U.S. Cl. .............. 370/329; 370/462; 455/574
(58) Field of Classification Search ........... 370/462, 370/448, 229, 401–402; 455/574
See application file for complete search history.

(56) References Cited

U.S. PATENT DOCUMENTS

| 5,909,444 A * | 6/1999 | Lee et al. ............ 370/462 |
| 6,721,331 B1 * | 4/2004 | Agrawal et al. ......... 370/448 |
| 2004/0029622 A1 * | 2/2004 | Laroia et al. ........... 455/574 |

FOREIGN PATENT DOCUMENTS

EP 0 959 634 11/1999
WO WO 99/38278 7/1999

OTHER PUBLICATIONS

Samir Kapoor et al., Initial Contribution on a System Meeting MBWA Characteristics, IEEE 802.20 Working Group on Mobile Broadband Wireless Access, Mar. 6, 2003.
Xiaoxin Qiu et al., An Enhanced RLC/MAC Design for Supporting Integrated Services over EGPRS, 2000 Wireless Communications and Networking Conference, Sep. 23, 2000.
Jae-Woo So et al., On Effect of Timer Object for Sleep Mode Operation in cdma2000 System, 2000 IEEE International Conference on Communications, Jun. 18, 2000.

* cited by examiner

*Primary Examiner*—Jean Gelin
*Assistant Examiner*—Phuoc H Doan
(74) *Attorney, Agent, or Firm*—The Farrell Law Firm, PC

(57) ABSTRACT

A mobile communication system includes a medium access control (MAC) layer that supports an idle state in which no downlink and uplink dedicated control channel and dedicated traffic channel exists and also supports an active state in which the downlink and uplink dedicated control channel and dedicated traffic channel exist. The MAC layer controls transitioning to a contention state and then transitioning from the contention state to the active state through contention-based access, if there is transmission data in the idle state; transitioning to a fast access state or a slow access state according to priority of the data if there is no transmission data in the active state for a preset time; transitioning to the active state through contention-free-based access if there is transmission data in the fast access state; and transitioning to the active state through contention-free-based access if there is transmission data in the slow access state.

28 Claims, 14 Drawing Sheets

| TYPE | CHANNEL NAME | DIRECTION | ROLE |
|---|---|---|---|
| CONTROL CHANNEL | Broadcast Control Channel (BCCH) | DOWNLINK | TRANSMIT SYSTEM INFORMATION AND CELL SPECIFIC INFORMATION ALL OVER CELL |
| | Paging Control Channel (PCCH) | DOWNLINK | TRANSMIT PAGING INFORMATION ALL OVER CELL |
| | Access Grant Channel (AGCH) | DOWNLINK | TRANSMIT RESPONSE INFORMATION TO UPLINK CHANNEL REQUEST INFORMATION TRANSMITTED OVER ACCH |
| | Dedicated Control Channel (DCCH) | DOWNLINK | TRANSMIT CONTROL INFORMATION FOR PARTICULAR MOBILE STATION |
| | Shared Control Channel (SCCH) | DOWNLINK | TRANSMIT DOWNLINK AND UPLINK SCHEDULING INFORMATION |
| TRAFFIC CHANNEL | Dedicated Traffic Channel (DTCH) | DOWNLINK | TRANSMIT DATA FOR PARTICULAR MOBILE STATION |
| | Shared Traffic Channel (STCH) | DOWNLINK | TRANSMIT DATA AND SHARED BY ONE OR MORE MOBILE STATIONS |

FIG.8

| TYPE | CHANNEL NAME | DIRECTION | ROLE |
|---|---|---|---|
| CONTROL CHANNEL | Access Control Channel (ACCH) | UPLINK | TRANSMIT UPLINK CHANNEL REQUEST INFORMATION |
| | Dedicated Control Channel (DCCH) | UPLINK | TRANSMIT CONTROL INFORMATION FOR PARTICULAR MOBILE STATION |
| | Fast Feedback Channel (FFCH) | UPLINK | TRANSMIT FEEDBACK INFORMATION SUCH AS CHANNEL REQUEST INFORMATION, CHANNEL QUALITY INFORMATION AND ACK/NACK INFORMATION AT SHORT PERIODS (BY FRAME) |
| | Slow Feedback Channel (SFCH) | UPLINK | TRANSMIT FEEDBACK INFORMATION SUCH AS CHANNEL REQUEST INFORMATION, CHANNEL QUALITY INFORMATION AND ACK/NACK INFORMATION AT LONG PERIODS (BY SUPERFRAME) |
| TRAFFIC CHANNEL | Dedicated Traffic Channel (DTCH) | UPLINK | TRANSMIT DATA FOR PARTICULAR MOBILE STATION |
| | Common Packet Channel (CPCH) | UPLINK | IT IS SIMILAR TO ACCH, BUT USED TO TRANSMIT SMALL AMOUNT OF DATA RATHER THAN CONTROL INFORMATION |

FIG.9

| CHANNEL | STATE | MAC STATE | | | | | |
|---|---|---|---|---|---|---|---|
| | | Idle | Contention | Slow Access | Fast Access | Active | |
| DOWNLINK | DTCH | X | X | X | X | O | |
| | STCH | X | X | O | O | O | |
| | DCCH | X | X | X | X | O | |
| | SCCH | X | X | O | O | O | |
| | PCCH | O | X | O | X | O | |
| | AGCH | X | O | X | O | X | |
| | BCCH | O | O | O | X | O | |
| UPLINK | DTCH | X | X | X | X | O | |
| | DCCH | X | X | X | X | O | |
| | FFCH | X | X | X | O | X | |
| | SFCH | X | O | O | X | X | |
| | ACCH | X | X | X | X | X | |
| | CPCH | X | X | O | O | X | |

FIG.10

METHOD FOR CONTROLLING OPERATIONAL STATES OF A MAC LAYER IN AN OFDM MOBILE COMMUNICATION SYSTEM

PRIORITY

This application claims priority under 35 U.S.C. § 119 to an application entitled "Method for Controlling Operational States of MAC Layer in an OFDM Mobile Communication System" filed in the Korean Intellectual Property Office on Jun. 13, 2003 and assigned Serial No. 2003-38374, the contents of which are incorporated herein by reference.

BACKGROUND OF THE INVENTION

1. Field of the Invention

The present invention relates generally to a mobile communication system using an orthogonal frequency division multiplexing (OFDM) scheme, and in particular, to a method for controlling operational states of a medium access control (MAC) layer.

2. Description of the Related Art

Since the development of a cellular mobile telecommunication system in the United States in the late 1970's, South Korea has begun providing a voice communication service with an AMPS (Advanced Mobile Phone Service) mobile communication system which can be regarded as a $1^{st}$ generation (1G) analog mobile communication system. Thereafter, a code division multiple access (CDMA) mobile communication system, a $2^{nd}$ generation (2G) mobile communication system, was commercialized in the middle of the 1990's to provide a voice and low-speed data service.

In addition, beginning in the late 1990's, IMT-2000 (International Mobile Telecommunication-2000), a $3^{rd}$ generation (3G) mobile communication system, aimed at providing an improved radio multimedia service, a worldwide roaming service and a high-speed data service, was developed and recently commercialized in part. Particularly, the 3G mobile communication system has been developed to transmit data at higher speed due to an increasing amount of data served in the existing mobile communication system.

Currently, the 3G mobile communication system is evolving into a $4^{th}$ generation (4G) mobile communication system. The 4G mobile communication system is being standardized with the intentions of providing efficient interworking and a unified service between a wired communication network and a wireless communication network, in addition to the simple radio communication service provided in the exiting mobile communication system. Therefore, it is necessary to develop technology capable of transmitting massive data approximating the capacity of a wired communication network, in a wireless communication network.

With the development of the mobile communication technology, the existing voice-centered service is evolving into a data-centered service, and thus, the mobile communication system is evolving from a circuit switching-based network into a packet switching-based network. The packet switching system assigns a channel only when there is data to transmit, thus causing frequent channel access and release operations. Furthermore, in the packet switching system, its entire system efficiency depends upon an operation method of a medium access control (MAC) layer that manages the channel access and release operations. An operation of the MAC layer will now be described below.

An operation of the MAC layer is determined according to a connection state between a mobile station (MS) and a mobile communication system, and each mobile communication system is unique in operation of its MAC layer. First, an operation of a MAC layer in the 2G mobile communication system will be described with reference to FIG. 1.

FIG. 1 schematically illustrates operational states supported by a MAC layer in a general 2G mobile communication system. Referring to FIG. 1, in the 2G mobile communication system, a MAC layer supports two operational states, i.e., an active state 111 and a dormant state 113. Herein, the 2G mobile communication system refers to, for example, a TIA/EIA-95-B system. The active state 111 represents a state in which there is traffic such as voice data to be transmitted to the mobile station, and downlink and uplink dedicated control channels (DCCH) and dedicated traffic channels (DTCH) are assigned to the mobile station. The dormant state 113 represents a state in which there is no downlink and uplink dedicated control channel and there is no base station (BS) and mobile switching center (MSC) resource. In this state, a point-to-point (PPP) state is held and there is a small amount of data burst.

In the 2G mobile communication system, even though there is no transmission and reception data in the active state, the MAC layer continuously assigns dedicated channels, i.e., a dedicated control channel and a dedicated traffic channel; so the 2G mobile communication system is not suitable for a data service having a burst characteristic. Because radio resources for dedicated channels are assigned to mobile stations even though there is no actual transmission and reception data, the number of mobile stations in the active state, which can be accommodated within a cell, is limited.

FIG. 2 schematically illustrates operational states supported by a MAC layer in a conventional 3G mobile communication system. Referring to FIG. 2, in the 3G mobile communication system, a MAC layer supports an active state 211, a control hold state 213, a suspended state 215, and a dormant state 217. Herein, the 3G mobile communication system refers to, for example, a CDMA2000 system.

The active state 211, like the active state 111 described in conjunction with FIG. 1, represents a state in which there is traffic to a mobile station and downlink and uplink dedicated control channels and dedicated traffic channels are assigned to the mobile station. The control hold state 213 represents a state in which power control (PC) is continuously performed, downlink and uplink dedicated control channels are assigned, and traffic channels can be rapidly reassigned. The suspended state 215 represents a state in which downlink and uplink dedicated control channels to the mobile station are not assigned, radio link protocol (RLP) and PPP states are held, a virtual active set exists, and a slotted submode is supported. The dormant state 217, like the dormant state 113 described in conjunction with FIG. 1, represents a state in which there is no downlink and uplink dedicated control channel, and also, there is no BS and MSC resource. In this state, a PPP state is held and a small amount of data burst exists.

In the 3G mobile communication system, the MAC layer supports the 4 operational states considering not only a voice service but also a data service to assign radio resources only when there is transmission/reception data, thereby improving the entire system performance. However, like the MAC layer of the 2G mobile communication system, the MAC layer of the 3G mobile communication system also must perform a contention-based random access procedure in order to transition from the control hold state 213, the suspended state 215, and the dormant state 217 to the active state 211. The contention-based random access procedure reduces a state transition speed from the other states to the active state 211, causing a decrease in the entire system performance. In addition, in the light of a structural characteristic of logical channels, the number of mobile stations having the control hold state 213 and the suspended state 215 is limited, so the 3G mobile communication system is not suitable for an 'always on' requirement, which is one of the major service quality satisfying requirements of a mobile communication system. The term 'always on' refers to a state in which contention-free-based random access rather than the contention-based radon access is available with downlink and uplink dedicated channels even in other states excluding an active state.

FIG. 3 schematically illustrates operational states supported by a MAC layer in a 4G mobile communication system, which is currently under discussion. A mobile communication system using an OFDM scheme (i.e., an OFDM mobile communication system) has been actively studied as a 4G mobile communication system. The OFDM scheme transmits data using multiple carriers, and is a kind of a multi-carrier modulation (MCM) scheme for parallel-converting a serial input symbol stream and modulating the parallel-converted symbols with a plurality of orthogonal subcarriers (or subchannels) before transmission. The OFDM scheme is similar to the conventional frequency division multiplexing (FDM) scheme, but characterized by maintaining orthogonality between the subcarriers thereby securing optimal transmission efficiency during high-speed data transmission. In addition, the OFDM scheme has high frequency efficiency and is robust against multipath fading, contributing to optimal transmission efficiency during high-speed data transmission.

In the proposed 4G mobile communication system, a MAC layer supports 5 optional states of an on-state 311, a hold state 313, a sleep state 315, an access state 317, and a null state 319. The on-state 311 represents a state in which data traffic is transmitted and received, there is a full fledged uplink control channel having all control information, and rich QoS (Quality of Service) functionality is supported. The hold state 313 represents a state in which timing is controlled, coarse power control is performed, rapid transition to the on-state 311 is possible on a contention-free basis, there is a thin uplink control channel having only basic control information, users can receive data traffic, and a power save mode is supported. The sleep state 315 represents a state in which no power and timing control is performed, an ultra power save mode is supported, and a large number of mobile stations are supported. The access state 317 is a random access state for channel acquisition, and the null state 319 is identical to the dormant state 217 illustrated in FIG. 2.

The MAC layer of the 4G mobile communication system defines logical channels that utilize characteristics of the OFDM scheme, enables contention-free-based random access in a particular state, and proposes operational states for increasing the number of available mobile stations as compared with the 3G mobile communication system. However, as described in conjunction with FIG. 3, the MAC layer of the 4G mobile communication system also must demand a contention-based random access procedure in order to transition from the other states to the on-state 311. In addition, the number of mobile stations which are available in a state where the contention-based random access procedure to the on-state 311 is not necessary, i.e., in the hold state 313, is limited.

Operational states of the MAC layers in the 2G, 3G, and 4G mobile communication systems have the following problems:

(1) unsuitableness for 'always on';

(2) long state transmission time due to contention-based random access;

(3) a necessity to continuously monitor a downlink shared control channel (SCCH) for downlink channel access;

(4) a limited number of mobile stations available in each state of the MAC layer; and (5) inefficiency in the light of power saving.

As described above, the operational states of the MAC layers proposed up to now have many problems. Accordingly, there are demands for operational states suitable to the MAC layer of the 4G mobile communication system, which is a future mobile communication system.

SUMMARY OF THE INVENTION

It is, therefore, an object of the present invention to provide a method for controlling operational states of a MAC layer in an OFDM mobile communication system.

It is another object of the present invention to provide a method for adaptively controlling operational states according to service quality in a MAC layer of an OFDM mobile communication system.

It is further another object of the present invention to provide a method for controlling operational states so as to minimize a state transition time to an active state in a MAC layer of an OFDM mobile communication system.

In accordance with one aspect of the present invention, there is provided a method for controlling operational states of a medium access control (MAC) layer in a mobile communication system including the MAC layer, the MAC layer supporting an idle state in which no downlink and uplink dedicated control channel and dedicated traffic channel exists and also supporting an active state in which the downlink and uplink dedicated control channel and dedicated traffic channel exist. The method comprises the steps of: if there is transmission data in the idle state, transitioning to a contention state and then transitioning from the contention state to the active state through contention-based access; transitioning to a fast access state or a slow access state according to priority of the data if there is no transmission data in the active state for a preset time; transitioning to the active state through contention-free-based access if there is transmission data in the fast access state; and transitioning to the active state through contention-free-based access if there is transmission data in the slow access state.

In accordance with another aspect of the present invention, there is provided a method for controlling operational states of a medium access control (MAC) layer in a mobile communication system including the MAC layer, the MAC layer supporting an idle state in which no downlink and uplink dedicated control channel and dedicated traffic channel exists and also supporting an active state in which the downlink and uplink dedicated control channel and dedicated traffic channel exist. The method comprises the steps of: if there is transmission data in the idle state, transitioning to a contention state and then transitioning from the contention state to the active state through contention-based access; transitioning to a fast access state or a slow access state according to priority of the data if there is no transmission data in the active state for a preset time; transitioning to the active state through contention-free-based access if there is transmission data in the fast access state; transitioning to the slow access state if there is no transmission data in the fast access state for a preset time; and transitioning to the active state through contention-free-based access if there is transmission data in the slow access state.

BRIEF DESCRIPTION OF THE DRAWINGS

The above and other objects, features, and advantages of the present invention will become more apparent from the following detailed description when taken in conjunction with the accompanying drawings in which:

FIG. 8 is a table illustrating types and roles of downlink logical channels for an OFDM mobile communication system;

FIG. 9 is a table illustrating types and roles of uplink logical channels for an OFDM mobile communication system;

FIG. 10 is a table schematically illustrating available logical channels for the MAC layer's operational states of FIG. 7;

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

Figure 1:
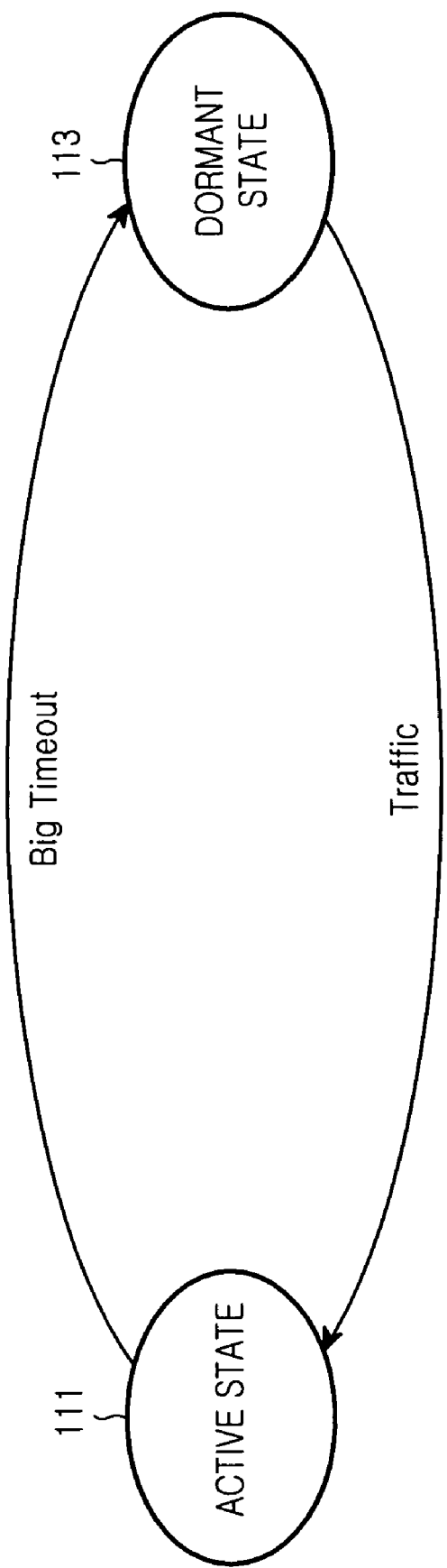
FIG. 1 schematically illustrates operational states supported by a MAC layer in a conventional 2G mobile communication system.
Figure 2:
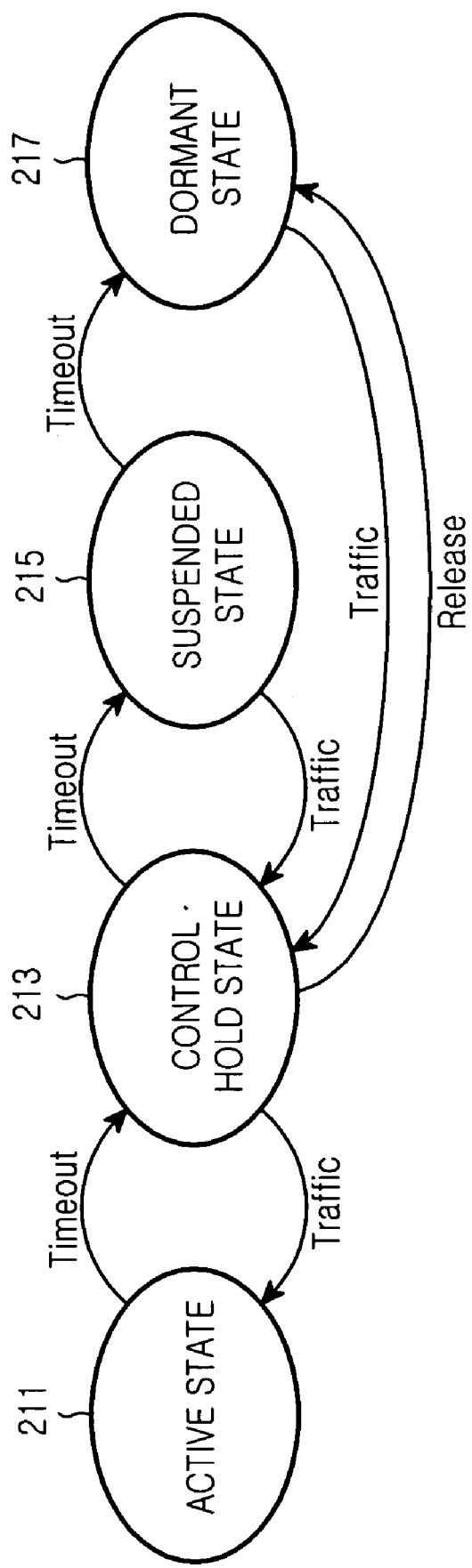
FIG. 2 schematically illustrates operational states supported by a MAC layer in a conventional 3G mobile communication system.
Figure 3:
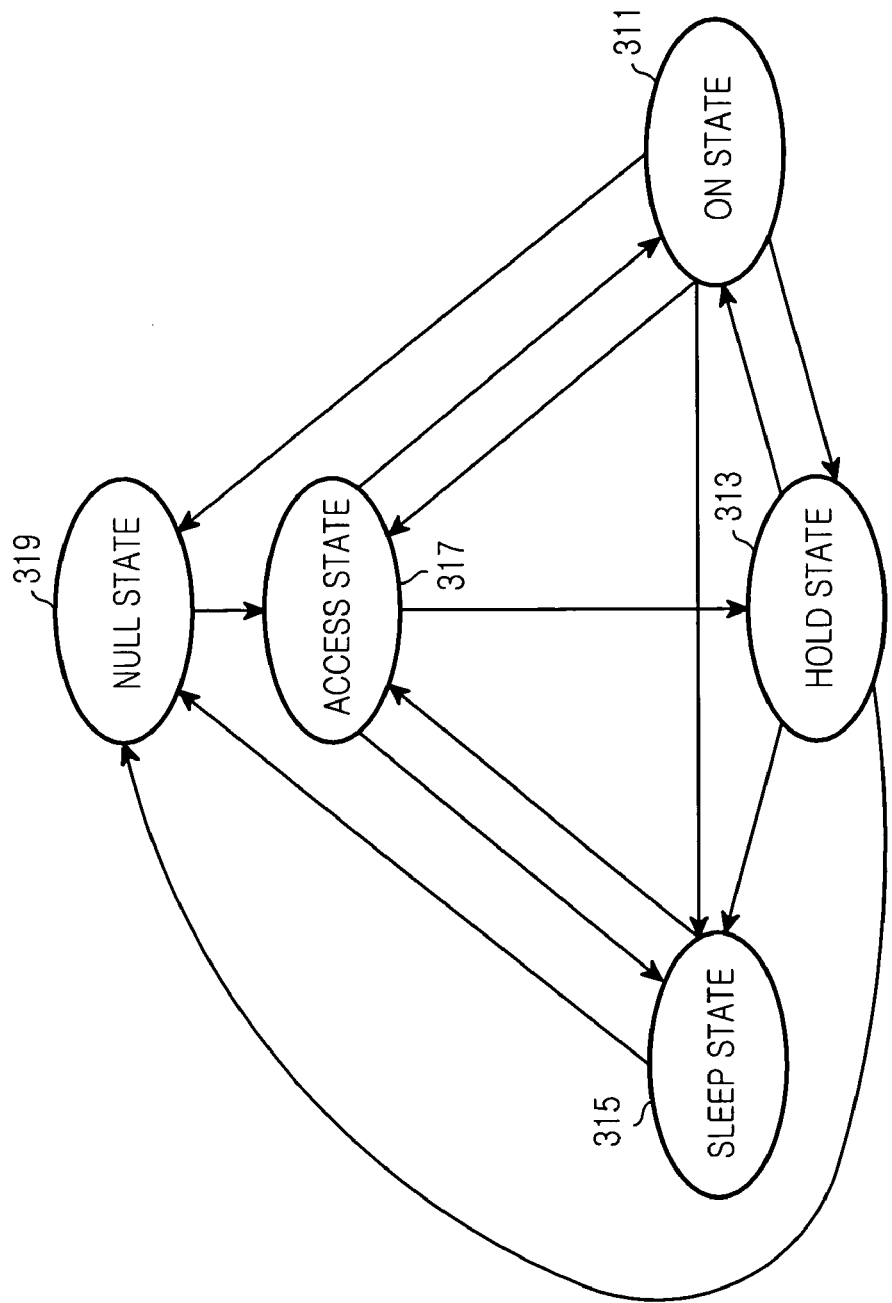
FIG. 3 schematically illustrates operational states supported by a MAC layer in a 4G mobile communication system, which is currently under discussion.
Figure 4:
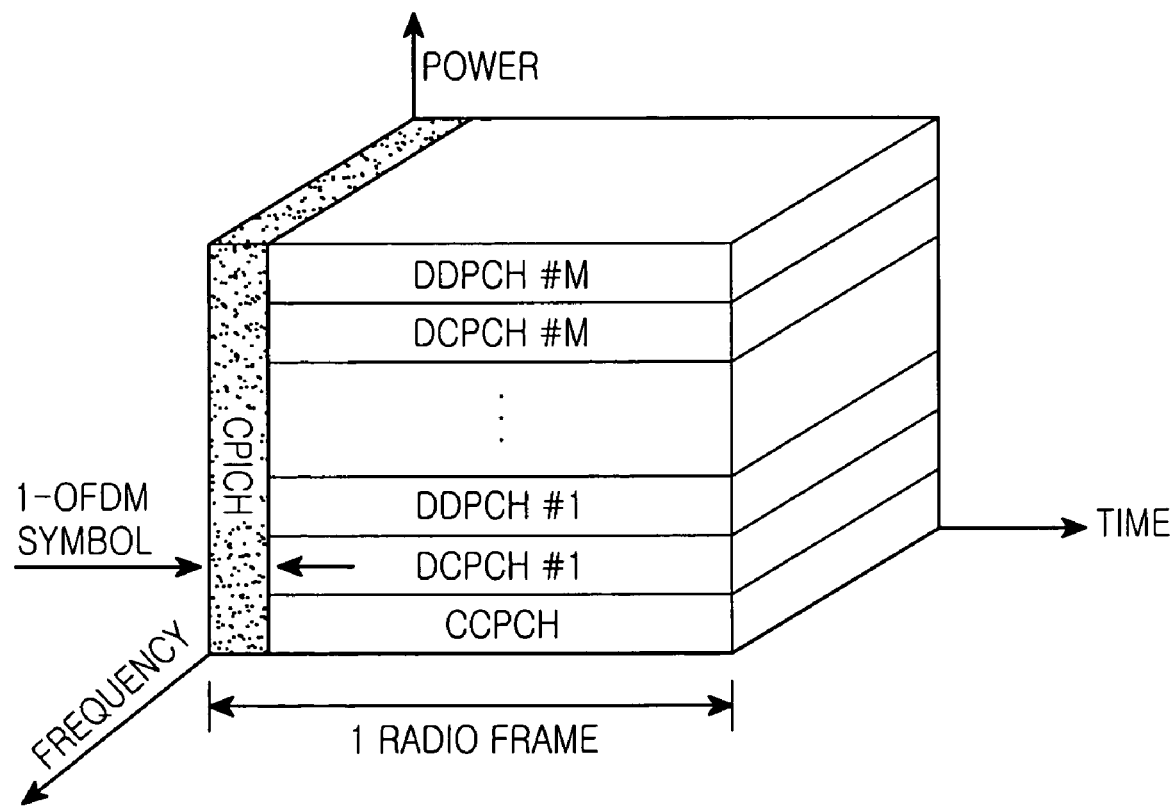
FIG. 4 schematically illustrates a structure of physical channels for an OFDM mobile communication system.

FIG. 4 schematically illustrates a structure of physical channels for an OFDM mobile communication system. The OFDM (Orthogonal Frequency Division Multiplexing) scheme divides time resource and frequency resource in a time domain and a frequency domain, respectively, thereby maximizing system capacity. Various modifications can be made to the OFDM scheme, and its typical example is an orthogonal frequency code division multiplexing (OFCDM) scheme.

Referring to FIG. 4, in the OFDM mobile communication system, physical channels are generated on the basis of two axes of time and frequency. That is, in the light of characteristics of the OFDM scheme, it is possible to divide one symbol into a plurality of subcarriers and divide one physical channel signal into a plurality of logical channels. FIG. 4 illustrates typical physical channels for an OFDM mobile communication system, including a dedicated data physical channel (DDPCH), a dedicated control physical channel (DCPCH), a common control physical channel (CCPCH), and a common pilot channel (CPICH). The DDPCH and DCPCH are associated channels. For example, if there are M mobile stations of MS#1 to MS#M, there are M DDPCHs of DDPCH#1 to DDPCH#M and M DCPCHs of DCPCH#1 to DCPCH#M. The DDPCH is a data channel exclusively assigned to a particular mobile station and transmits user data, while the DCPCH is a control channel exclusively assigned to a particular mobile station and transmits control data. The CCPCH is a control channel assigned in common to all mobile stations located in the same cell, and transmits control data that must be assigned in common to all the mobile stations. The CPICH is transmitted to all mobile stations located in the same cell, and transmits a particular pilot signal. The mobile stations perform a synchronization acquisition operation and a power control operation by the CPICH signal.

Figure 5:
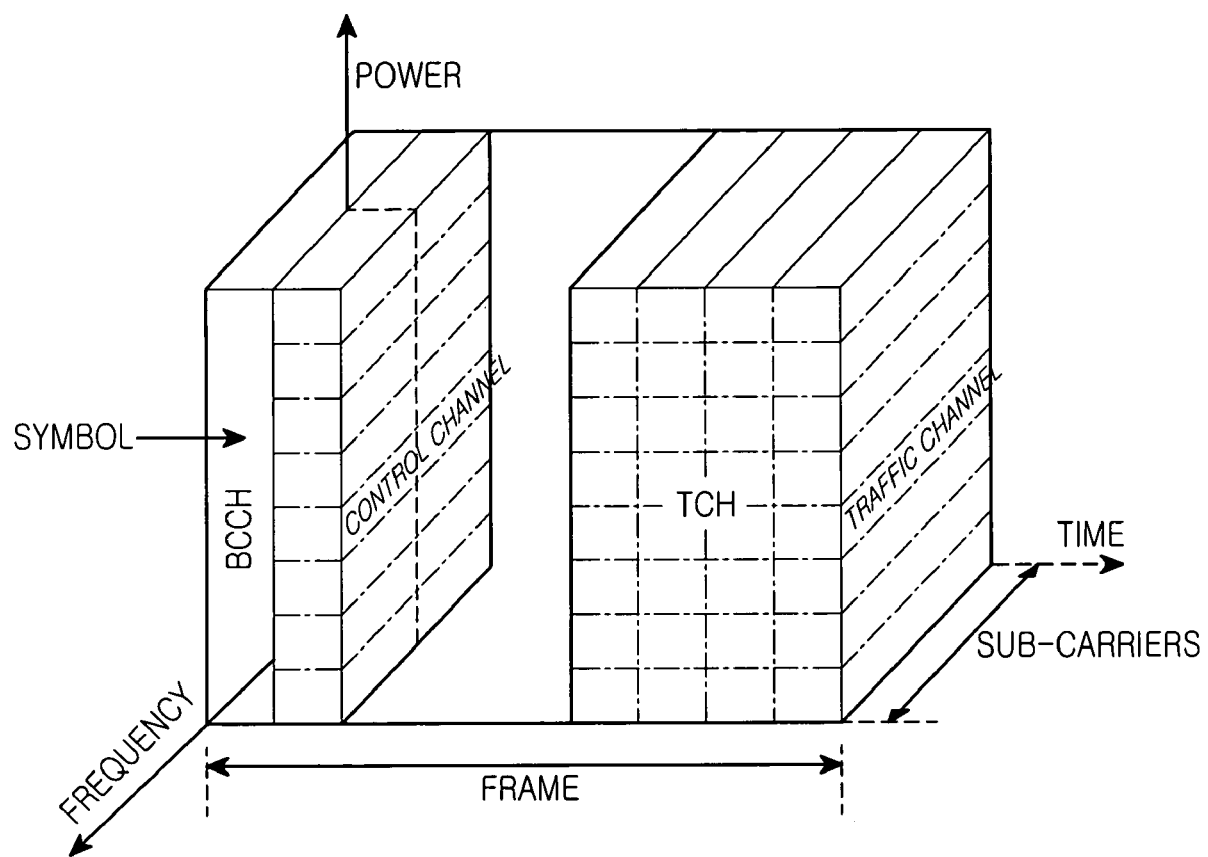
FIG. 5 schematically illustrates a structure of logical channels for an OFDM mobile communicant system.

FIG. 5 schematically illustrates a structure of logical channels for an OFDM mobile communicant system. Referring to FIG. 5, as described in conjunction with FIG. 4, in the OFDM mobile communication system, logical channels are generated on the basis of two axes of time and frequency. FIG. 5 illustrates typical logical channels for an OFDM mobile communication system, including a broadcast control channel (BCCH) and a traffic channel (TCH).

Figure 6:
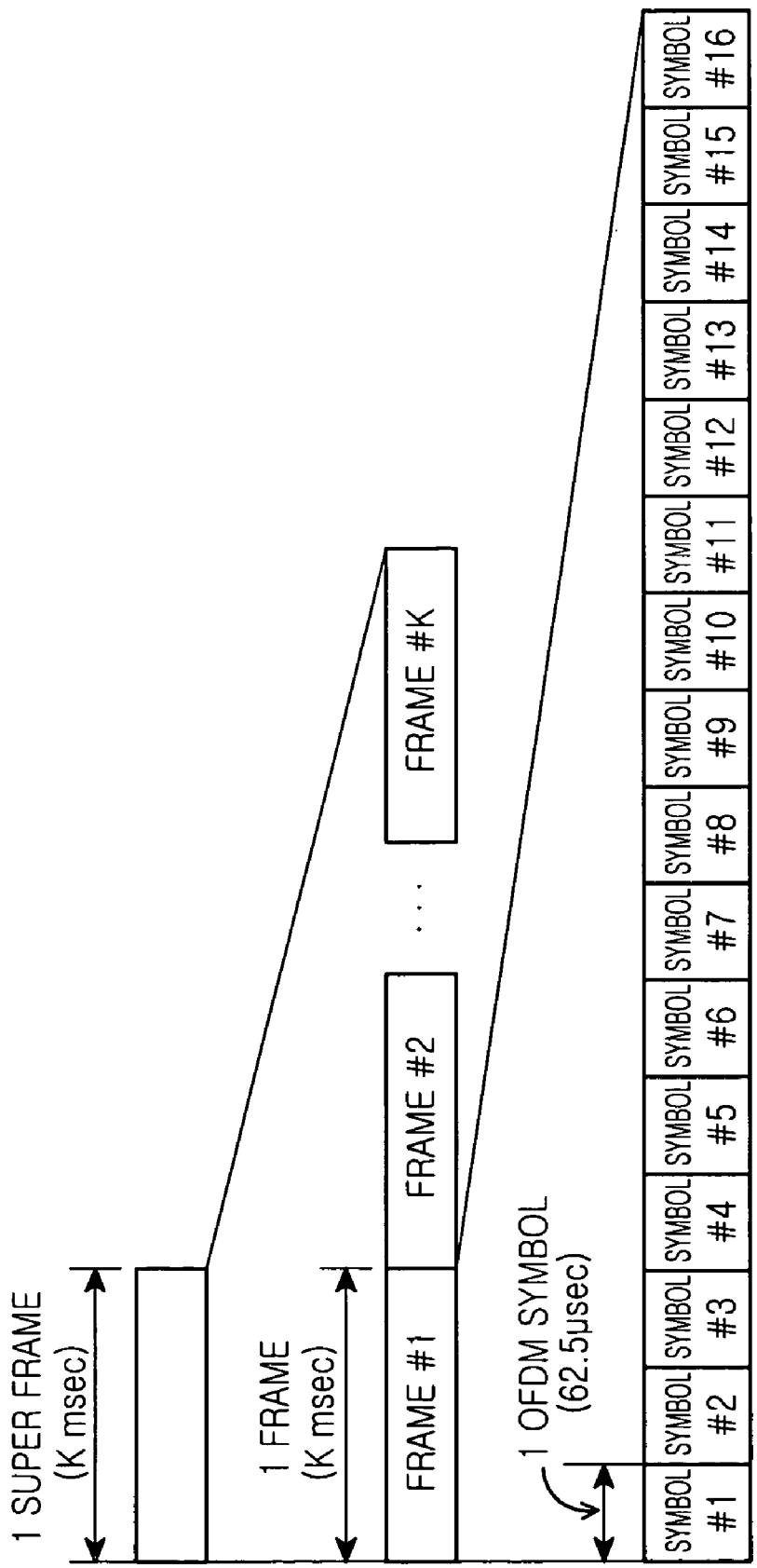
FIG. 6 schematically illustrates a frame structure for an OFDM mobile communication system.

FIG. 6 schematically illustrates a frame structure for an OFDM mobile communication system. Referring to FIG. 6, one frame for an OFDM mobile communication system is comprised of 16 OFDM symbols, i.e., Symbol#1 to Symbol#16, and each of the OFDM symbols has a length of 62.5 μsec. Therefore, one frame has a length of 1 msec. In addition, one superframe for the OFDM mobile communication system is comprised of K frames, i.e., Frame#1 to Frame#K. Therefore, one superframe has a length of Kmsec.

An operation of a medium access control (MAC) layer is determined according to a connection state between a mobile station and a mobile communication system. Operational states of a MAC layer, proposed in the present invention, will now be described with reference to FIG. 7.

Figure 7:
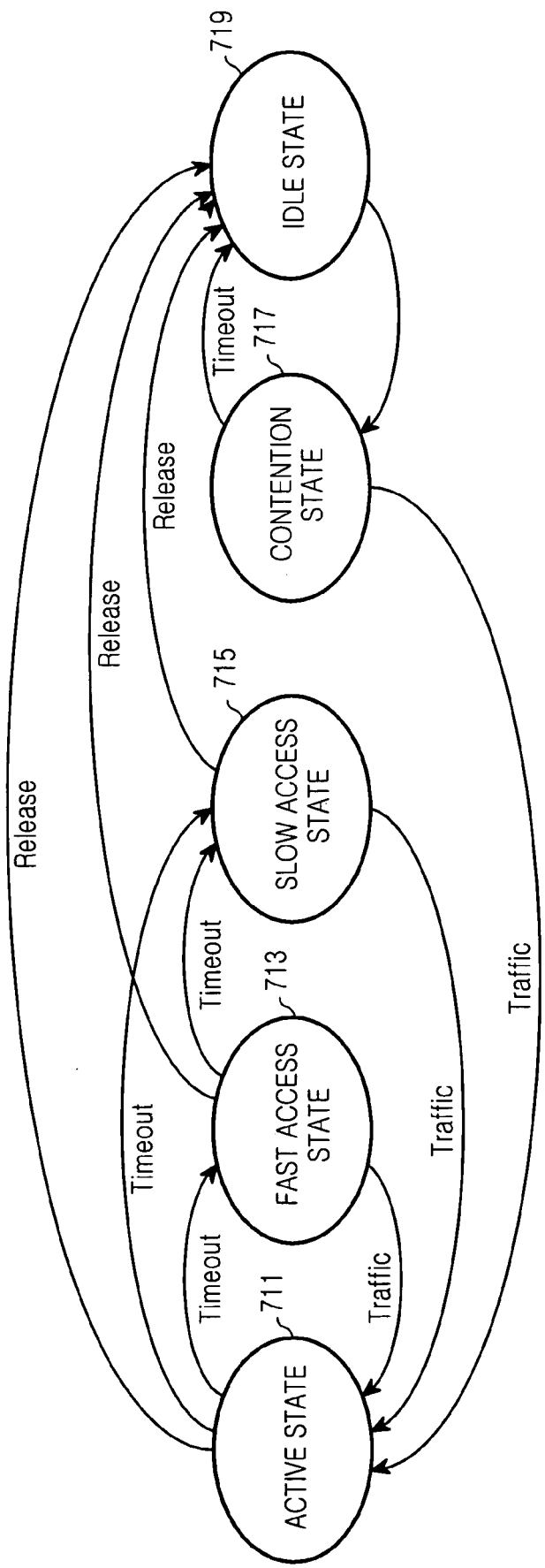
FIG. 7 schematically illustrates operational states supported by a MAC layer in an OFDM mobile communication system according to an embodiment of the present invention.

FIG. 7 schematically illustrates operational states supported by a MAC layer in an OFDM mobile communication system according to the present invention. Referring to FIG. 7, in an OFDM mobile communication system, a MAC layer supports 5 operational states of an active state 711, a fast access state 713, a slow access state 715, a contention state 717, and an idle state 719. Before a description of the operational states of the MAC layer, downlink logical channels and uplink logical channels for the OFDM mobile communication system will be described.

FIG. 8 is a table illustrating types and roles of downlink logical channels for an OFDM mobile communication system. Referring to FIG. 8, the downlink logical channels are roughly classified into control channels and traffic channels. The control channels include a broadcast control channel (BCCH), a paging control channel (PCCH), an access grant channel (AGCH), a dedicated control channel (DCCH), and a shared control channel (SCCH). The traffic channels include a dedicated traffic channel (DTCH), and a shared traffic channel (STCH). Roles of the respective channels will now be described herein below.

(1) BCCH

The BCCH is a downlink channel and delivers system information (SI) and cell specific information, and the BCCH signal is broadcasted all over the cell.

(2) PCCH

The PCCH delivers paging information, and the PCCH is broadcasted all over the cell.

(3) AGCH

The AGCH delivers response information to uplink channel request information delivered over an access control channel (ACCH), i.e., delivers a response to the uplink channel request.

(4) DCCH

The DCCH is a channel for delivering control information for a particular mobile station, targeting only the particular mobile station.

(5) SCCH

The SCCH delivers downlink and uplink scheduling information.

(6) DTCH

The DTCH is a channel for delivering data for a particular mobile station, targeting only the specific mobile station.

(7) STCH

The STCH is a channel for delivering data, and is shared by a plurality of mobile stations.

FIG. 9 is a table illustrating types and roles of uplink logical channels for an OFDM mobile communication system. Referring to FIG. 9, the uplink logical channels are also roughly classified into control channels and traffic channels. The control channels include ACCH, DCCH, a fast feedback channel (FFCH), and a slow feedback channel (SFCH). The traffic channels include DTCH and a common packet channel (CPCH). Roles of the respective channels will now be described herein below.

(1) ACCH

The ACCH delivers uplink channel request information.

(2) DCCH

The DCCH delivers control information for a particular mobile station.

(3) FFCH

The FFCH delivers such feedback information (FBI) as channel request information, channel quality information (CQI), and normal reception (ACK)/abnormal reception (NACK) information, at comparatively short transmission periods. Herein, the FFCH is a channel newly proposed in the present invention, and is transmitted at relatively short periods, for example, at periods of a frame.

(4) SFCH

The SFCH delivers such feedback information as channel request information, channel quality information and ACK/NACK information at comparatively long transmission periods. Herein, the SFCH is also a channel newly proposed in the present invention, and is transmitted at relatively long periods, for example, at periods of a superframe.

(5) DTCH

The DTCH is a channel for delivering data of a particular mobile station.

(6) CPCH

The CPCH is similar to the ACCH in format. However, the CPCH delivers a comparatively small amount of data while the ACCH delivers control information.

The operational states of the MAC layer will now be described in detail with reference to FIG. 7. First, the active state 711 will be described. The active state 711 represents a state in which there is a traffic channel to a particular mobile station and downlink DCCH and DTCH are assigned to the mobile station. In the active state 711, state transition can occur to other states excluding the contention state 717, i.e., the fast access state 713, the slow access state 715, and the idle state 719. When a session is closed in the active state 711, no more radio resource is required due to the close of the session. Therefore, dedicated channels, i.e., DCCH and DTCH, held in the active state 711 are released, and then, state transition happens to the idle state 719. Unlike this, even though a session is not actually closed in the active state 711, if there is no transmission and reception data for a predetermined time or longer due to a burst property of the data, then state transition occurs to the fast access state 713 or the slow access state 715 according to QoS (Quality of Service) guaranteed for a corresponding mobile station or a traffic class of data the corresponding mobile station is receiving. In the active state 711, state transition can occur to the fast access state 713 or the slow access state 715 according to the QoS or the traffic class. However, it will be assumed herein that state transition occurs from the active state 711 to the fast access state 713 or the slow access state 715 according to the traffic class.

For example, it will be assumed that a traffic class supported in the OFDM mobile communication system is classified into four classes, i.e., a conversational class, a streaming class, an interactive class, and a background class. The conversational class is a class assigned for real-time, high-capacity, high-speed data such as a moving image, and the streaming class is a class assigned for such data as VOD (Video On Demand). The interactive class is a class assigned for such data as web service data, and the background class is the lowest class and has the lowest priority among the traffic classes. In this case, if data is discontinued while the mobile station is receiving a service in the streaming class in the active state 711, i.e., if there is no transmission reception data, then state transition happens from the active state 711 to the fast access state 713. The fast access state 713, as will be described below, can be adapted to perform an operation corresponding to the traffic class and QoS, because state transition to the active state 711 happens fast. If data is discontinued while the mobile station is receiving a service in the interactive class in the active state 711, i.e., if there is no transmission and reception data, then state transition occurs from the active state 711 to the slow access state 715. The slow access state 715, as will be described below, can be adapted to perform an operation corresponding to the traffic class and QoS, because state transition to the active state 711 is slow as compared with the fast access state 713 but state transition to the active state 711 is comparatively fast.

As state transition from the active state 711 to the other states occurs, logical channels, i.e., DCCH and DTCH, held in the active state 711 and the other logical channels except for the DCCH and DTCH are released. A detailed description of channel hold and release states in the active state 711 and in the other operational states will be made later.

A mobile station in the fast access state 713 is assigned FFCH as an uplink control channel. The FFCH, as described above, is a channel assigned at comparatively short periods, i.e., assigned every frame, and its size is variable according to an amount of feedback information. However, in order to minimize overhead of the MAC layer, the FFCH is adapted to use minimum radio resource. If state transition to the active state 711 is required, i.e., if there is a signal to transmit, the mobile station in the fast access state 713 rapidly requests an uplink traffic channel using the FFCH. The uplink traffic channel request in the fast access state 713 is made on a contention-free basis, and because a transmission period of the FFCH is a frame unit, fast state transition to the active state 711 is possible. For example, if one frame is 1 msec, the FFCH is transmitted at periods of 1 msec. Therefore, a time required in being assigned an uplink data channel is determined within several milliseconds (msec) even though a propagation delay and a proceeding time are considered. A time required in being assigned the FFCH is expressed as $$\text{FFCH period} + T_{BS\_Scheduling\_Process} + \text{downlink SCCH reception time} \qquad \text{Equation (1)}$$

Moreover, in order to minimize power consumption, the mobile station in the fast access state 713 does not monitor all downlink SCCHs, but supports a slotted mode in which the mobile station monitors only a particular SCCH according to a property of a session or QoS.

A mobile station in the slow access state 715 is assigned SFCH as an uplink control channel. Compared with the FFCH, the SFCH is a channel assigned at comparatively long periods, i.e., assigned every superframe, and its size is variable according to an amount of feedback information. However, in order to minimize overhead of the MAC layer, the SFCH, like the FFCH, is adapted to use minimum radio resource. If state transition to the active state 711 is required, i.e., if there is uplink data, the mobile station in the slow access state 715 requests an uplink data channel using the SFCH. The uplink data channel request in the slow access state 715 is also made on a contention-free basis, and because a transmission period of the SFCH is a superframe unit, comparatively slow state transition to the active state 711 is possible as compared with when the FFCH is used. For example, if one superframe is comprised of 10 frames and each frame is 1 msec, the SFCH is transmitted at periods of 10 msec. Therefore, a time required in being assigned an uplink data channel does not exceed 20 msec. A time required in being assigned the SFCH is expressed as $$\text{SFCH period} + T_{BS\_Scheduling\_Process} + \text{downlink SCCH reception time} \qquad \text{Equation (2)}$$

Moreover, in order to minimize power consumption, the mobile station in the slow access state 715 also does not monitor all downlink SCCHs, but supports a slotted mode in which the mobile station monitors only a particular SCCH according to a property of a session or QoS.

A mobile station in the contention state 717 performs a random access procedure using ACCH in a MAC layer, and receives a response to the random access procedure through AGCH. Because the mobile station in the contention state 717 performs random access on a contention basis, it is possible to make state transition to the active state 711 considering a radio resource state of a base station and access states of other mobile stations. Therefore, a time required in transitioning from the contention state 717 to the active state 711 is randomly changed according to circumstances.

A mobile station in the idle state 719 cannot be assigned both downlink and uplink dedicated channels, i.e., DCCH and DTCH. If there is data to transmit, the mobile station in the idle state 719 transitions to the contention state 717 and again transitions from the contention state 717 to the active state 711 according to the random access procedure. As a result, because state transition from the idle state 719 to the active state 711 is contention-based state transition, a time required for the state transition becomes longer as compared with the contention-free-based state transition.

FIG. 10 is a table schematically illustrating available logical channels for the MAC layer's operational states of FIG. 7. FIG. 10 illustrates the active state 711, the fast access state 713, the slow access state 715, the contention state 717, and the idle state 719. The logical channels assignable in the respective operational states will now be described herein below.

First, in the active state 711, DTCH, STCH, DCCH, SCCH, PCCH, and BCCH can be assigned as downlink logical channels, and DTCH and DCCH can be assigned as uplink logical channels. In the fast access state 713, STCH, SCCH, PCCH, and BCCH can be assigned as downlink logical channels, and FFCH and CPCH can be assigned as uplink logical channels. In the slow access state 715, STCH, SCCH, PCCH, and BCCH can be assigned as downlink logical channels, and SFCH and CPCH can be assigned as uplink logical channels. In the contention state 717, AGCH and BCCH can be assigned as downlink logical channels, and ACCH can be assigned as uplink logical channel. In the idle state 719, PCCH and BCCH can be assigned as downlink logical channels, and no uplink logical channel can be assigned. As illustrated in FIG. 10, in the active state 711, downlink and uplink dedicated control and traffic channels are all assigned, and in the fast access state 713 and the slow access state 715, because no actual data is transmitted, only downlink and uplink dedicated control channels are assigned. However, if there is data to transmit, state transition to the active state 711 occurs using the FFCH and SFCH.

In order to make state transition from the fast access state 713 and the slow access state 715 to the active state 711 as described above, a contention-free-based uplink channel acquisition procedure is required. The contention-free-based uplink channel acquisition procedure will now be described with reference to FIG. 11.

Figure 11:
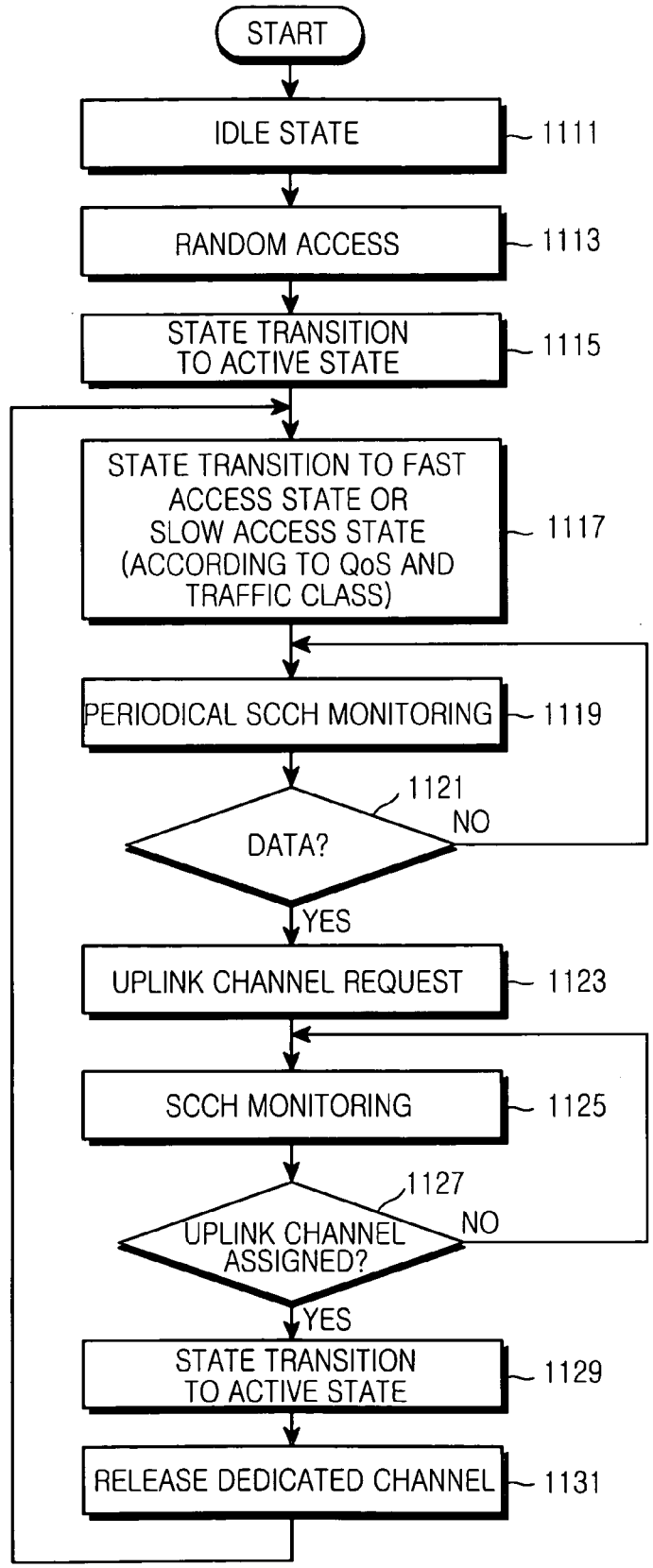
FIG. 11 is a flowchart illustrating a contention-free-based uplink channel acquisition procedure in the MAC layer's operational states of FIG. 7.

FIG. 11 is a flowchart illustrating a contention-free-based uplink channel acquisition procedure in the MAC layer's operational states of FIG. 7. Referring to FIG. 11, in step 1111, the MAC layer is in the idle state 719. If there is data to transmit, the MAC layer performs random access in step 1113 In step 1115, the MAC layer transitions from the idle state 719 to the contention state 717 according to the random access and then performs random access in the contention state 717 to make state transition to the active state 711. If there is no transmission data for a predetermined time in the active state 711, the MAC layer transitions in step 1117 to the fast access state 713 or the slow access state 715 considering QOS and a traffic class of a corresponding mobile station. In step 1119, the MAC layer periodically monitors SCCH. The SCCH monitoring operation, as described above, does not monitor all downlink SCCHs, but supports a slotted mode in which the MAC layer monitors only a particular SCCH according to a property of a session or QoS.

In step 1121, the MAC layer determines whether data is generated. If no data is generated, the MAC layer returns to step 1119. However, if data is generated, the MAC layer proceeds to step 1123. It will be assumed herein that "data is generated" is a case where an amount of data stored in a queue of the mobile station is larger than or equal to a preset data amount. That is, even though data was actually generated, if an amount of data stored in the queue of the mobile station is smaller than the preset data amount, the MAC layer proceeds to step 1123 only when an amount of the data stored in the queue of the mobile station becomes larger than or equal to the preset data amount while performing an operation of periodically monitoring SCCH. In addition, the preset data amount is determined according to QoS or a traffic class during initial session setup. Of course, in the active state 711, the preset data amount can be variably adjusted through inband signaling. In step 1123, the MAC layer requests an uplink channel through a feedback channel, or FFCH, when the MAC layer exists in the fast access state 713 while the MAC layer requests an uplink channel through SFCH when the MAC layer exists in the slow access state 715.

In step 1125, the MAC layer monitors the SCCH after performing the uplink channel request, and then proceeds to step 1127. In step 1127, the MAC layer determines whether an uplink channel requested by the uplink channel request is assigned, as a result of the SCCH monitoring. If the uplink channel is not assigned, the MAC layer returns to step 1125. However, if the uplink channel is assigned, the MAC layer proceeds to step 1129. In step 1129, the MAC layer transitions from the fast access state 713 or the slow access state 715 to the active state 711. If there is no transmission data in the active state 711 for a predetermined time or longer, the MAC layer releases in step 1131 the dedicated channels, i.e., DCCH and DTCH, and then returns to step 1117.

Figure 12:
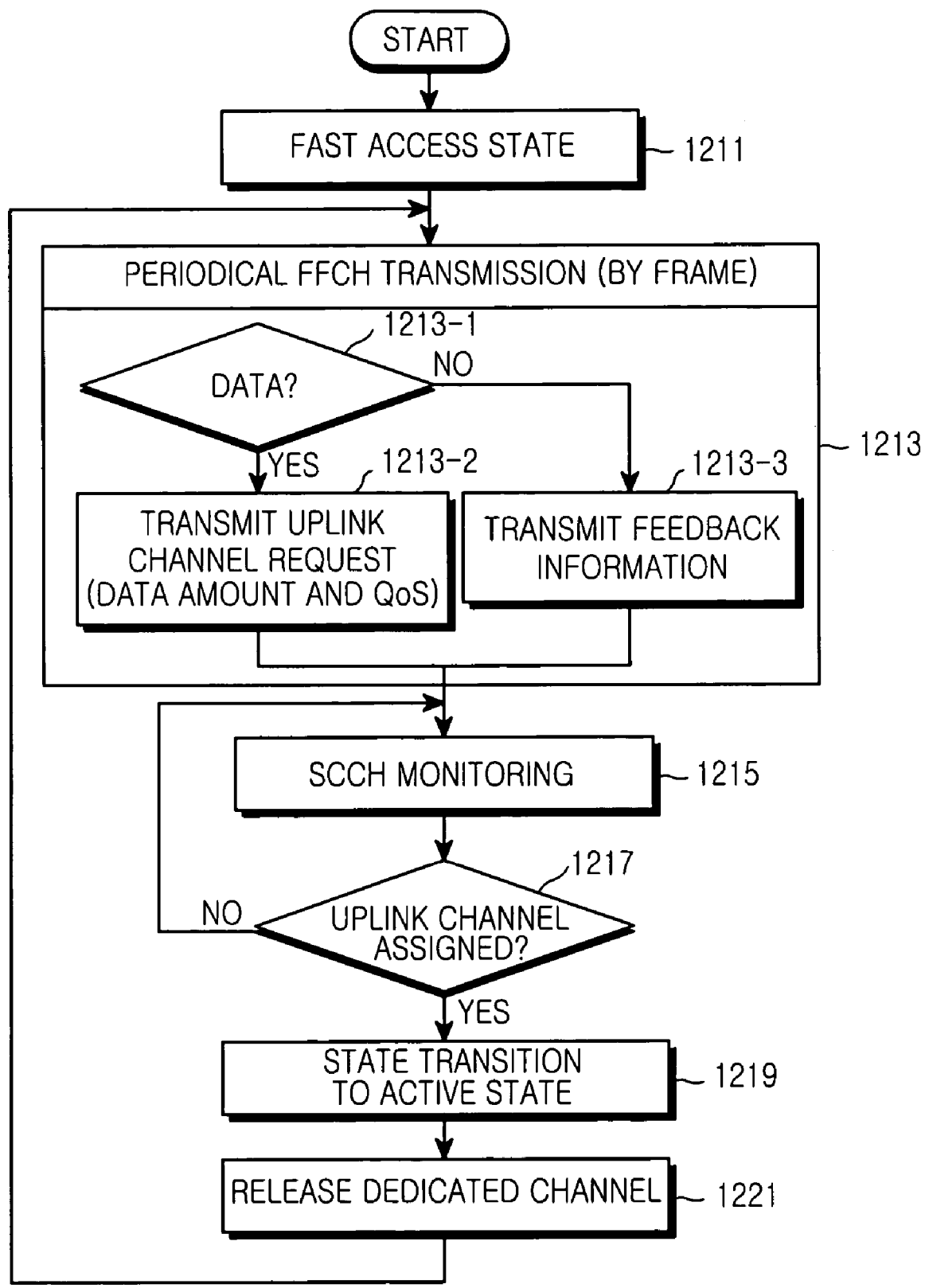
FIG. 12 is a flowchart illustrating a contention-free-based uplink channel acquisition procedure in the fast access state of FIG. 11.

FIG. 12 is a flowchart illustrating a contention-free-based uplink channel acquisition procedure in the fast access state 713 illustrated in FIG. 11. Referring to FIG. 12, because the MAC layer is in the fast access state 713 in step 1211, it periodically transmits FFCH in step 1213. The FFCH, as described above, is transmitted at comparatively short periods, i.e., transmitted at periods of frame. Although a transmission period of the FFCH is referred to as a frame period, the transmission period of the FFCH can be either set to a value previously set in the system, or variably set according to QoS or a traffic class. A detailed description of the step 1213 will be made below.

Because the MAC layer is in the fast access state 713, it determines in step 1213-1 whether data is generated. If data is generated, the MAC layer proceeds to step 1213-2. As described in conjunction with FIG. 11, it will be assumed that "data is generated" is a case where an amount of data stored in a queue of the mobile station is larger than or equal to a preset data amount. That is, even though data was actually generated, if an amount of data stored in the queue of the mobile station is smaller than the preset data amount, the MAC layer determines that no data is generated. In step 1213-2, the MAC layer transmits an uplink channel request to a base station along with an amount of the generated data and QoS information, and then proceeds to step 1215. Here, the uplink channel request is transmitted over the FFCH. However, if it is determined in step 1213-1 that no data is generated, the MAC layer proceeds to step 1213-3. In step 1213-3, the MAC layer transmits feedback information including, for example, ACK/NACK information, and then proceeds to step 1215. Also, the feedback information is transmitted over the FFCH.

In step 1215, the MAC layer monitors SCCH after transmitting the FFCH. In step 1217, the MAC layer determines whether an uplink channel is assigned, as a result of the SCCH monitoring. If the uplink channel is not assigned, the MAC layer returns to step 1215. However, if the uplink channel is assigned, the MAC layer proceeds to step 1219. A detailed description of a base station's operation for assignment of the uplink channel will be described later. In step 1219, the MAC layer transitions from the fast access state 713 to the active state 711, and then proceeds to step 1221. If there is no transmission data in the active state 711 for a predetermined time or longer, the MAC layer releases in step 1221 the dedicated channels, i.e., DCCH and DTCH, and then returns to step 1213.

Figure 13:
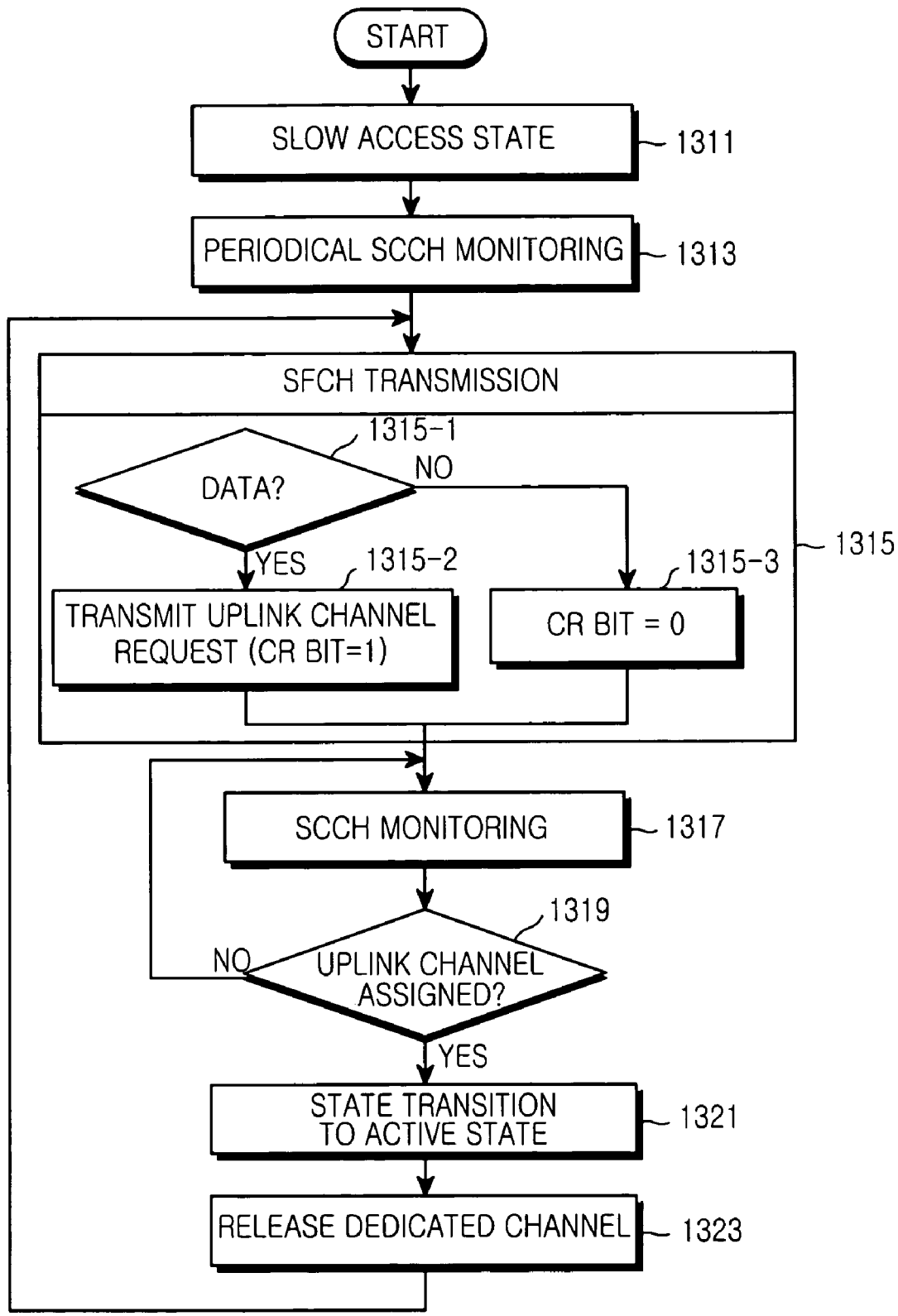
FIG. 13 is a flowchart illustrating a contention-free-based uplink channel acquisition procedure in the slow access state of FIG. 11.

FIG. 13 is a flowchart illustrating a contention-free-based uplink channel acquisition procedure in the slow access state 715 illustrated FIG. 11. Referring to FIG. 13, because the MAC layer is in the slow access state 715 in step 1311, it periodically monitors SCCH in step 1313, and then proceeds to step 1315. In step 1315, the MAC layer transmits SFCH. The SFCH, as described above, is transmitted at comparatively long periods as compared with the FFCH, i.e., transmitted at periods of superframe. Although a transmission period of the SFCH is referred to as a superframe period, the transmission period of the SFCH can be either set to a value previously set in the system, or variably set according to QoS or a traffic class. A detailed description of the step 1315 will be made below.

Because the MAC layer is in the slow access state 715, it determines in step 1315-1 whether data is generated. If data is generated, the MAC layer proceeds to step 1315-2. As described in conjunction with FIG. 11, it will be assumed that "data is generated" is a case where an amount of data stored in a queue of the mobile station is larger than or equal to a preset data amount. That is, even though data was actually generated, if an amount of data stored in the queue of the mobile station is smaller than the preset data amount, the MAC layer determines that no data is generated. In step 1315-2, the MAC layer transmits an uplink channel request to a base station, and then proceeds to step 1317. Here, the uplink channel request is transmitted over the SFCH, and one channel request (CR) bit indicating the uplink channel request is set to "1" before being transmitted. The CR bit indicates whether an uplink channel request exists. For example, CR bit=1 indicates presence of an uplink channel request, while CR bit=0 indicates absence of an uplink channel request. The reason for inserting a CR bit in the SFCH is to minimize overhead of the MAC layer due to transmission of the SFCH.

However, if it is determined in step 1315-1 that no data is generated, the MAC layer proceeds to step 1315-3. In step 1315-3, the MAC layer transmits the SFCH with the CR bit set to "0," and then proceeds to step 1317.

In step 1317, the MAC layer monitors SCCH after transmitting the SFCH, and in step 1319, the MAC layer determines whether an uplink channel is assigned, as a result of the SCCH monitoring. If the uplink channel is not assigned, the MAC layer returns to step 1317. However, if the uplink channel is assigned, the MAC layer proceeds to step 1321. A detailed description of a base station's operation for assignment of the uplink channel will be described later. In step 1321, the MAC layer transitions from the slow access state 715 to the active state 711, and then proceeds to step 1323. If there is no transmission data in the active state 711 for a predetermined time or longer, the MAC layer releases in step 1323 the dedicated channels, i.e., DCCH and DTCH, and then returns to step 1315.

Figure 14:
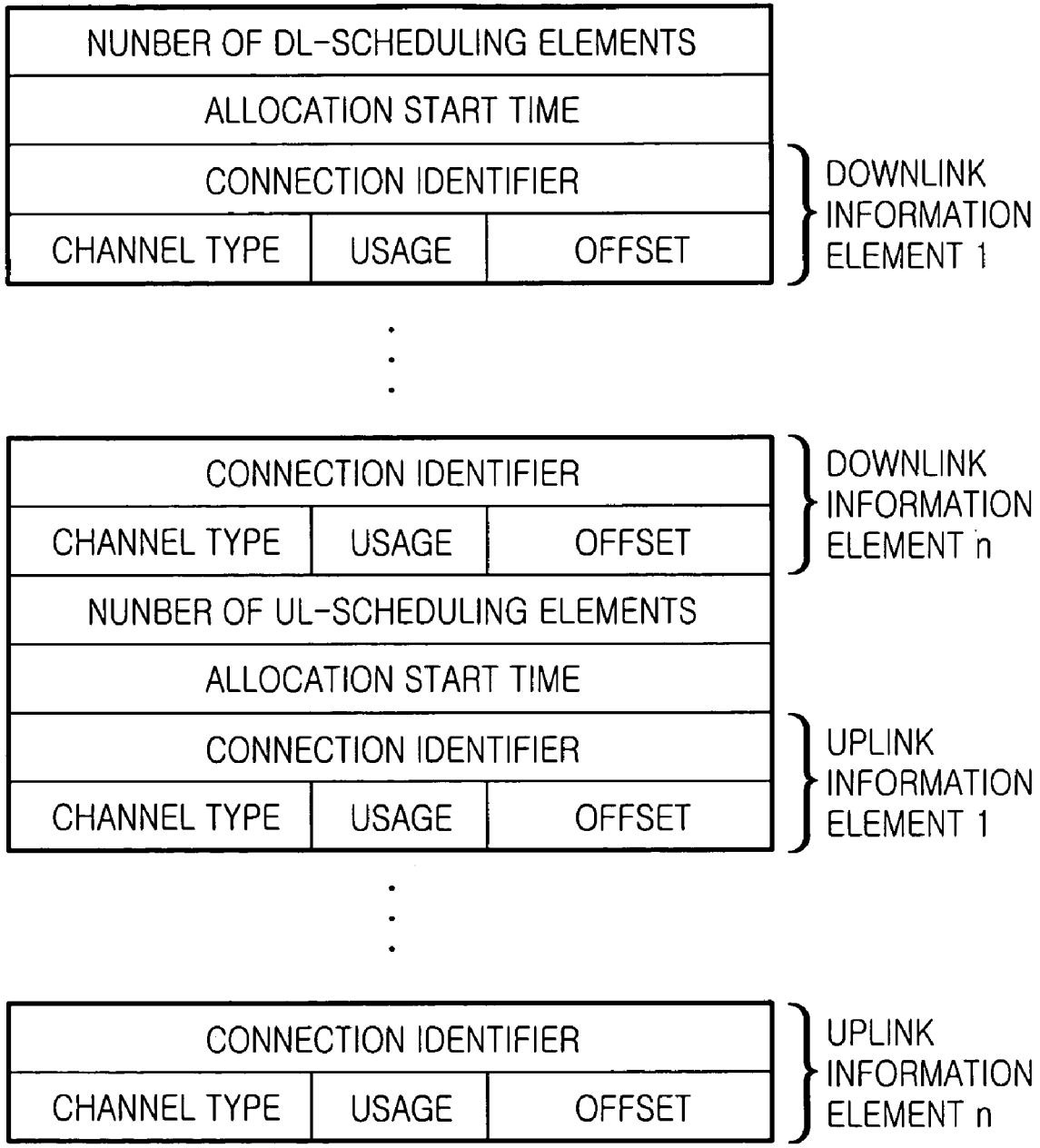
FIG. 14 schematically illustrates a process of transmitting scheduling information based on channel assignment by a base station according to an embodiment of the present invention.

FIG. 14 schematically illustrates a process of transmitting scheduling information based on channel assignment by a base station according to an embodiment of the present invention. In FIG. 14, an SCCH frame structure transmits scheduling information based on uplink channel assignment in the base station. As illustrated in FIG. 14, 'NUMBER OF DL-SCHEDULING ELEMENTS' indicates the number of downlink scheduling elements scheduled in the base station, and 'ALLOCATION START TIME' indicates a time when allocation of a downlink channel is started. Further, 'CONNECTION IDENTIFIER' indicates a connection identifier of a mobile station that actually allocates the downlink channel, 'CHANNEL TYPE' indicates a type of a downlink channel allocated, 'USAGE' indicates usage of the allocated downlink channel, and 'OFFSET' indicates offset information of the allocated downlink channel. The CONNECTION IDENTIFIER, CHANNEL TYPE, USAGE, and OFFSET constitute one downlink information element, and in this manner, downlink information elements for N allocated downlink channels are created.

In addition, 'NUMBER OF UL-SCHEDULING ELEMENTS' indicates the number of uplink scheduling elements in the base station, and 'ALLOCATION START TIME' indicates a time when allocation of an uplink channel is started. Further, 'CONNECTION IDENTIFIER' indicates a connection identifier of a mobile station that actually allocates the uplink channel, 'CHANNEL TYPE' indicates a type of an uplink channel allocated, 'USAGE' indicates usage of the allocated uplink channel, and 'OFFSET' indicates offset information of the allocated uplink channel. The CONNECTION IDENTIFIER, CHANNEL TYPE, USAGE and OFFSET constitute one uplink information element, and in this manner, uplink information elements for N allocated uplink channels are created.

A transmission period of the SCCH is determined according to a minimum time unit scheduled in a base station, and is generally determined by the frame. Though not illustrated in FIG. 14, the base station allocates FFCH for the mobile stations in the fast access state 713, and allocates SFCH for the mobile stations in the slow access state 715. Because the FFCH, as described above, is a change that is transmitted by the frame, the base station allocates FFCH to the mobile stations in the fast access state 713 by fair scheduling while scheduling uplink channels every frame. Unlike this, because the SFCH, as described above, is a channel, which is transmitted by the superframe, the base station allocates SFCH to the mobile stations in the slow access state 715 by selecting frames for each mobile station group among a plurality of frames constituting the superframe. When the mobile stations transmit uplink channel requests through FFCH and SFCH after the base station transmits scheduling information over downlink SCCH in this manner, the base station schedules uplink channel allocation in the next scheduling operation by considering the uplink channel requests.

As can be understood from the foregoing description, the present invention adaptively controls operational states of a MAC layer according to QoS or a traffic class in an OFDM mobile communication system, thereby contributing to improvement in the entire system performance. In addition, the invention rapidly acquires an uplink dedicated channel on a contention-free basis for the data having high QoS or traffic class, thereby improving the entire system performance. Moreover, the invention can support an 'always on' requirement in which contention-free-based access is possible even in other states except the active state, and increase the number of mobile stations capable of supporting the contention-free-based uplink channel acquisition, thereby improving QoS. By enabling the contention-free-based uplink channel acquisition, the present invention minimizes a time required in making state transition to the active state.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling operational states of a medium access control (MAC) layer in a mobile communication system including the MAC layer, the MAC layer supporting an idle state in which no downlink and uplink dedicated control channel and dedicated traffic channel exists and also supporting an active state in which the downlink and the uplink dedicated control channel and the dedicated traffic channel exist, the method comprising the steps of:
   (a) transitioning to a contention state and then transitioning from the contention state to the active state through contention-based access if there is transmission data in the idle state;
   (b) transitioning to one of a fast access state and a slow access state according to priority of the data if there is no transmission data in the active state for a preset time;
   (c) transitioning to the active state through contention-free-based access if there is transmission data in the fast access state; and
   (d) transitioning to the active state through contention-free-based access if there is transmission data in the slow access state.

2. The method of claim 1, wherein the contention-free-based access in the fast access state is performed by requesting an assignment of an uplink dedicated traffic channel using a fast feedback channel (FFCH).

3. The method of claim 2, wherein a transmission period of the fast feedback channel is set to one of a predetermined period and a period corresponding to the priority.

4. The method of claim 2, wherein the fast feedback channel includes uplink dedicated traffic channel assignment request information, channel quality information of the assignment-requested uplink dedicated traffic channel, and feedback information.

5. The method of claim 1, wherein the contention-free-based access in the slow access state is performed by requesting an assignment of an uplink traffic channel using a slow feedback channel (SFCH).

6. The method of claim 5, wherein a transmission period of the slow feedback channel is set to one of a predetermined period and a period corresponding to the priority.

7. The method of claim 5, wherein the slow feedback channel includes uplink dedicated traffic channel assignment request information.

8. The method of claim 5, wherein the slow feedback channel further includes channel quality information of the assignment requested uplink dedicated traffic channel and feedback information.

9. The method of claim 1, wherein the step (c) comprises the steps of:
   transmitting a fast feedback channel and uplink dedicated traffic channel assignment request information if there is transmission data in the fast access state; and
   monitoring a shared control channel after requesting assignment of the uplink dedicated traffic channel, and transitioning to the active state, if the uplink dedicated traffic channel is assigned.

10. The method of claim 9, further comprising the step of transmitting the fast feedback channel and feedback information if there is no transmission data in the fast access state.

11. The method of claim 1, wherein the step (d) comprises the steps of:
transmitting a slow feedback channel and uplink dedicated traffic channel assignment request information if there is transmission data in the slow access state; and
monitoring a shared control channel after requesting assignment of the uplink dedicated traffic channel, and transitioning to the active state, if the uplink dedicated traffic channel is assigned.

12. The method of claim 11, wherein the uplink dedicated traffic channel assignment request information is an uplink dedicated traffic channel assignment request bit, and the uplink dedicated traffic channel assignment request bit is set to a first value.

13. The method of claim 12, further comprising the step of transmitting the slow feedback channel by setting the uplink dedicated traffic channel assignment request bit to a second value if there is no transmission data in the slow access state.

14. The method of claim 1, wherein the priority is determined according to one of service quality of the data and a traffic class.

15. A method for controlling operational states of a medium access control (MAC) layer in a mobile communication system including the MAC layer, the MAC layer supporting an idle state in which no downlink and uplink dedicated control channel and dedicated traffic channel exists and also supporting an active state in which the downlink and the uplink dedicated control channel and the dedicated traffic channel exist, the method comprising the steps of:
(a) transitioning to a contention state and then transitioning from the contention state to the active state through contention-based access, if there is transmission data in the idle state;
(b) transitioning to one of a fast access state and a slow access state according to priority of the data if there is no transmission data in the active state for a preset time;
(c) transitioning to the active state through the contention-free-based access if there is transmission data in the fast access state;
(d) transitioning to the slow access state if there is no transmission data in the fast access state for a preset time; and
(e) transitioning to the active state through the contention-free-based access if there is transmission data in the slow access state.

16. The method of claim 15, wherein the contention-free-based access in the fast access state is performed by requesting an assigmnent of an uplink dedicated traffic channel using a fast feedback channel (FFCH).

17. The method of claim 16, wherein a transmission period of the fast feedback channel is set to one of a predetermined period and a period corresponding to the priority.

18. The method of claim 16, wherein the fast feedback channel includes uplink dedicated traffic channel assignment request information, channel quality information of the assignment-requested uplink dedicated traffic channel, and feedback information.

19. The method of claim 15, wherein the contention-free-based access in the slow access state is performed by requesting an assignment of an uplink traffic channel using a slow feedback channel (SFCH).

20. The method of claim 19, wherein a transmission period of the slow feedback channel is set to one of a predetermined period and a period corresponding to the priority.

21. The method of claim 19, wherein the slow feedback channel includes uplink dedicated traffic channel assignment request information.

22. The method of claim 19, wherein the slow feedback channel further includes channel quality information of the assignment-requested uplink dedicated traffic channel.

23. The method of claim 15, wherein the step (c) comprises the steps of:
transmitting a fast feedback channel and uplink dedicated traffic channel assignment request information if there is transmission data in the fast access state; and
monitoring a shared control channel after requesting assignment of the uplink dedicated traffic channel, and transitioning to the active state, if the uplink dedicated traffic channel is assigned.

24. The method of claim 23, further comprising the step of transmitting the fast feedback channel and feedback information, if there is no transmission data in the fast access state.

25. The method of claim 15, wherein the step (e) comprises the steps of:
transmitting a slow feedback channel and uplink dedicated traffic channel assignment request information, if there is transmission data in the slow access state; and
monitoring a shared control channel after requesting assignment of the uplink dedicated traffic channel, and transitioning to the active state if the uplink traffic channel is assigned.

26. The method of claim 25, wherein the uplink dedicated traffic channel assignment request information is an uplink dedicated traffic channel assignment request bit, and the uplink dedicated traffic channel assignment request bit is set to a first value.

27. The method of claim 26, further comprising the step of transmitting the slow feedback channel by setting the uplink dedicated traffic channel assignment request bit to a second value if there is no transmission data in the slow access state.

28. The method of claim 15, wherein the priority is determined according to one of service quality of the data and a traffic class.

* * * * *